United States Patent
Heckler et al.

(10) Patent No.: US 10,875,563 B2
(45) Date of Patent: Dec. 29, 2020

(54) CONVERTIBLE STROLLER ASSEMBLY

(71) Applicants: Jenny Heckler, Cincinnati, OH (US); Julianne Cook, Cincinnati, OH (US)

(72) Inventors: Jenny Heckler, Cincinnati, OH (US); Julianne Cook, Cincinnati, OH (US)

(*) Notice: Subject to any disclaimer, the term of this patent is extended or adjusted under 35 U.S.C. 154(b) by 0 days.

(21) Appl. No.: 16/373,800

(22) Filed: Apr. 3, 2019

(65) Prior Publication Data
US 2020/0317246 A1    Oct. 8, 2020

(51) Int. Cl.
| B62B 7/00 | (2006.01) |
| B62B 7/12 | (2006.01) |
| A47D 5/00 | (2006.01) |
| B62B 9/24 | (2006.01) |
| B62B 9/12 | (2006.01) |
| B62B 9/10 | (2006.01) |

(52) U.S. Cl.
CPC ............... *B62B 7/12* (2013.01); *A47D 5/006* (2013.01); *B62B 9/104* (2013.01); *B62B 9/108* (2013.01); *B62B 9/12* (2013.01); *B62B 9/24* (2013.01)

(58) Field of Classification Search
CPC .. B62B 7/02; B62B 9/104; B62B 9/12; B62B 9/24
See application file for complete search history.

(56) References Cited

U.S. PATENT DOCUMENTS

| 3,101,970 | A |   | 8/1963 | Karmel | |
| D310,645 | S | * | 9/1990 | Julien | ............ D12/129 |
| D367,771 | S |   | 3/1996 | Julian | |
| 7,347,442 | B1 | * | 3/2008 | Carter | ............ B62B 9/00 280/642 |
| 7,618,055 | B2 |   | 11/2009 | Chuah | |
| 8,480,114 | B1 |   | 7/2013 | Grantz | |
| 9,668,589 | B2 |   | 6/2017 | Cortez | |
| 9,939,811 | B1 | * | 4/2018 | Fitzpatrick | ............ A47D 5/006 |
| 10,017,200 | B2 | * | 7/2018 | Jakubowski | ............ B62B 9/20 |
| 2007/0170674 | A1 | * | 7/2007 | Chuah | ............ A47D 5/006 280/47.38 |
| 2009/0178203 | A1 | * | 7/2009 | Homan | ............ A47D 5/006 5/655 |
| 2010/0016601 | A1 | * | 1/2010 | Cervello Pages | .... C07D 211/58 546/244 |
| 2011/0232000 | A1 |   | 9/2011 | Rodriguez | |

(Continued)

FOREIGN PATENT DOCUMENTS

WO    WO2007086946    8/2007

*Primary Examiner* — Hau V Phan
(74) *Attorney, Agent, or Firm* — Lamon Patent Services; Cynthia S. Lamon

(57) ABSTRACT

A convertible stroller assembly includes a stroller that has a seat and a backrest that is pivotally coupled to the seat. The backrest is positionable in an upright position for having an infant seated thereon. Moreover, the backrest is positionable in a reclined position having each of the seat and the backrest forming a diaper changing table. Thus, the infant can be laid on the infant table for changing a diaper. A pair of legs is each pivotally coupled to the backrest. Each of the legs is positionable in a deployed position for supporting the backrest when the backrest is positioned in the reclined position. A pair of privacy panels is each slidably coupled to the seat and each of the privacy panels is positionable in a deployed position to conceal the infant while the diaper is being changed.

7 Claims, 9 Drawing Sheets

(56) References Cited

U.S. PATENT DOCUMENTS

2016/0128491 A1* 5/2016 Martiniuk ............ A47D 13/025
                                                                280/47.41
2017/0055721 A1   3/2017 Penello

* cited by examiner

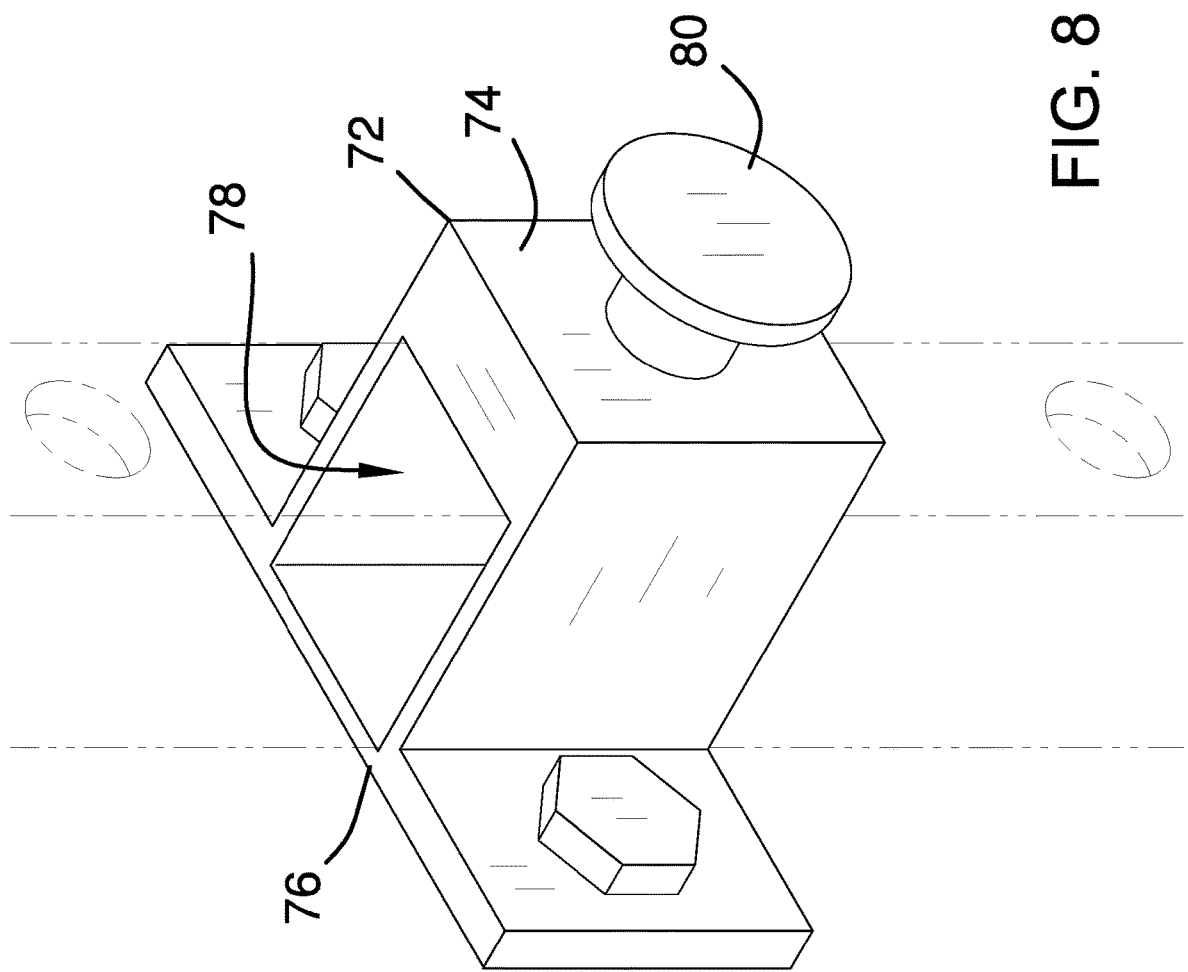

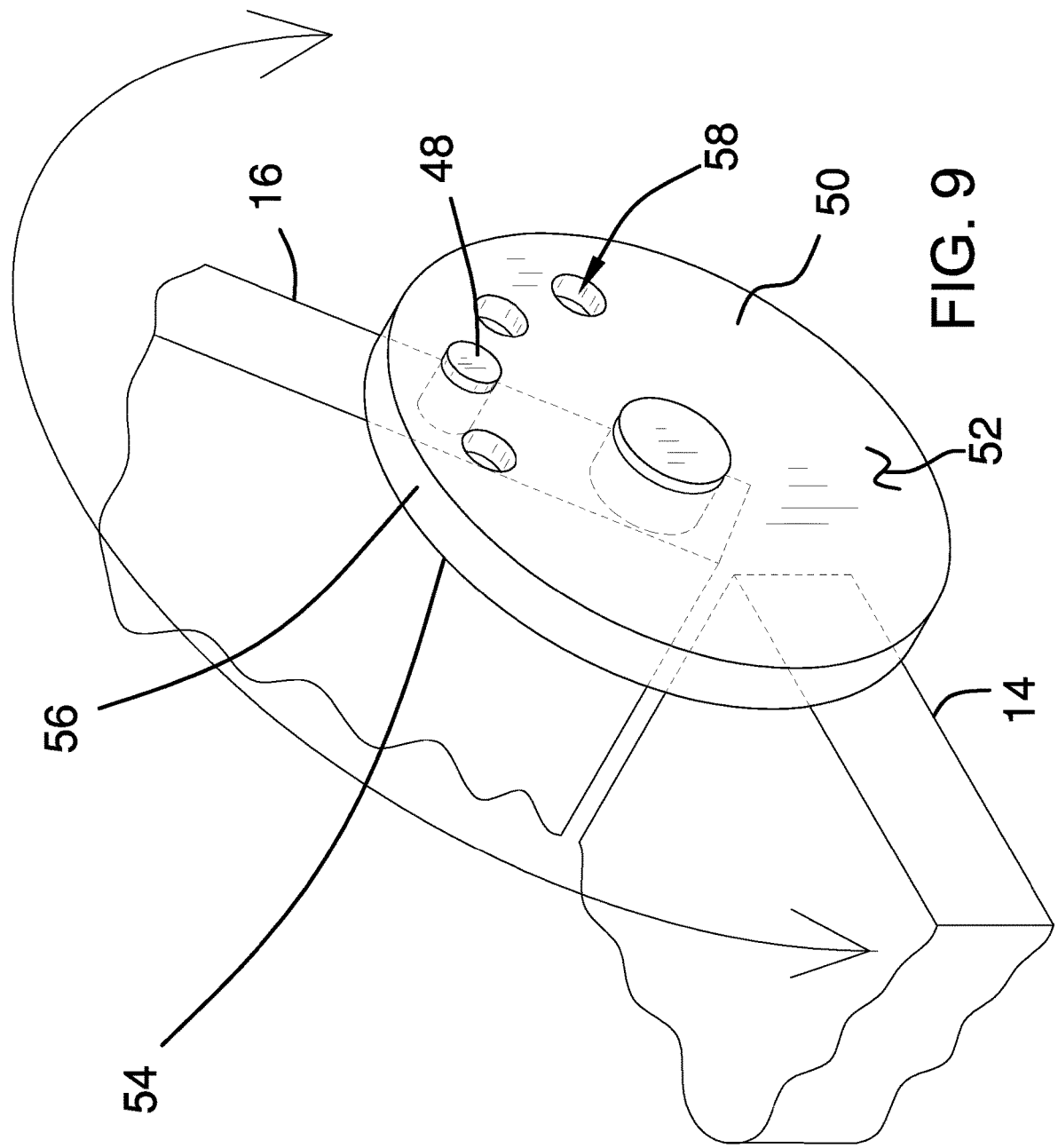

CONVERTIBLE STROLLER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to stroller devices and more particularly pertains to a new stroller device for converting a stroller into a diaper changing table.

BRIEF SUMMARY OF THE INVENTION

An embodiment of the disclosure meets the needs presented above by generally comprising a stroller that has a seat and a backrest that is pivotally coupled to the seat. The backrest is positionable in an upright position for having an infant seated thereon. Moreover, the backrest is positionable in a reclined position having each of the seat and the backrest forming a diaper changing table. Thus, the infant can be laid on the infant table for changing a diaper. A pair of legs is each pivotally coupled to the backrest. Each of the legs is positionable in a deployed position for supporting the backrest when the backrest is positioned in the reclined position. A pair of privacy panels is each slidably coupled to the seat and each of the privacy panels is positionable in a deployed position to conceal the infant while the diaper is being changed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 8 is a detail view taken from circle 8 of FIG. 7 of an embodiment of the disclosure.

FIG. 9 is a detail view taken from circle 9 of FIG. 1 of an embodiment of the disclosure.

DETAILED DESCRIPTION OF THE INVENTION

Figure 1:
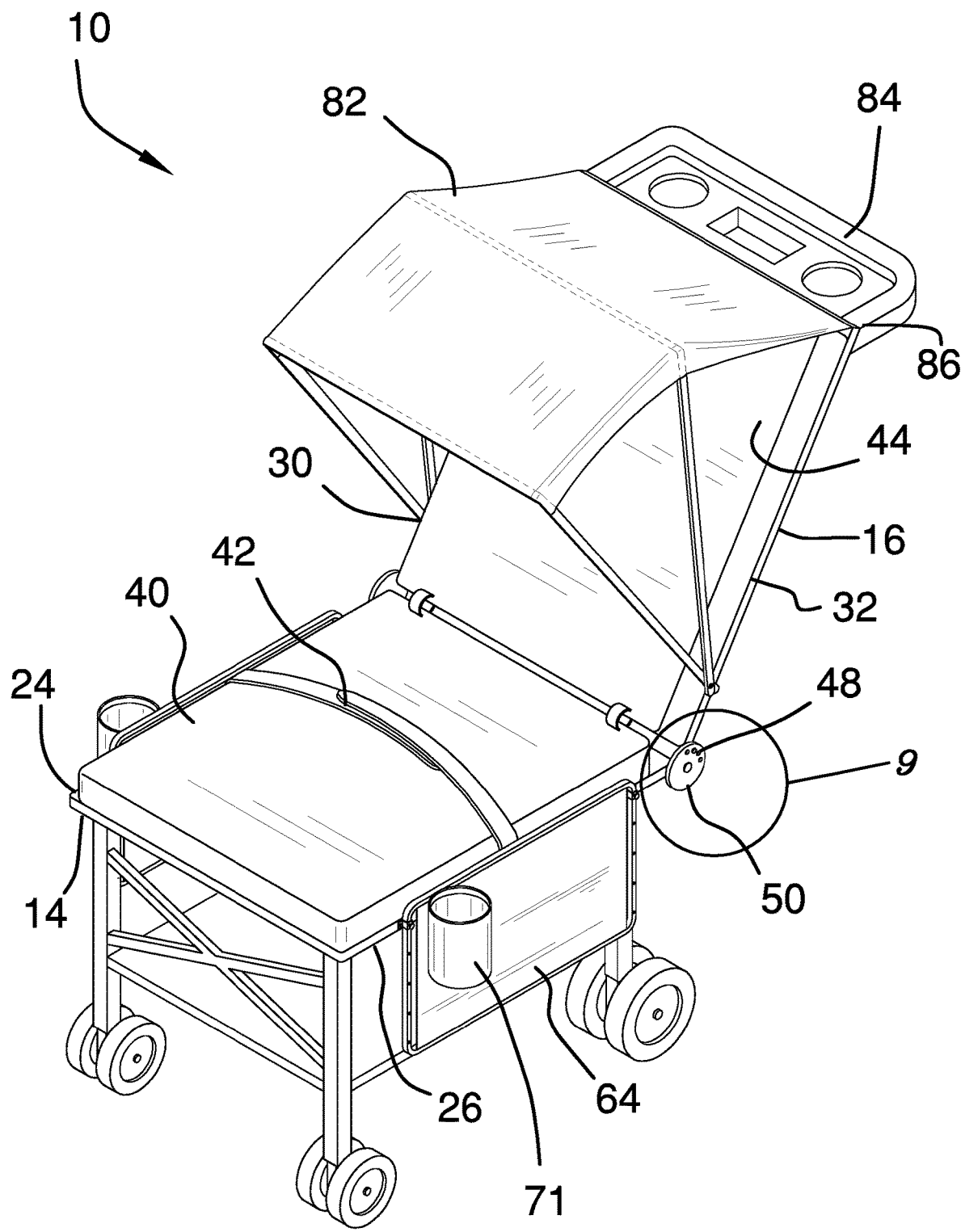
FIG. 1 is a top perspective view of a convertible stroller assembly according to an embodiment of the disclosure.
Figure 2:
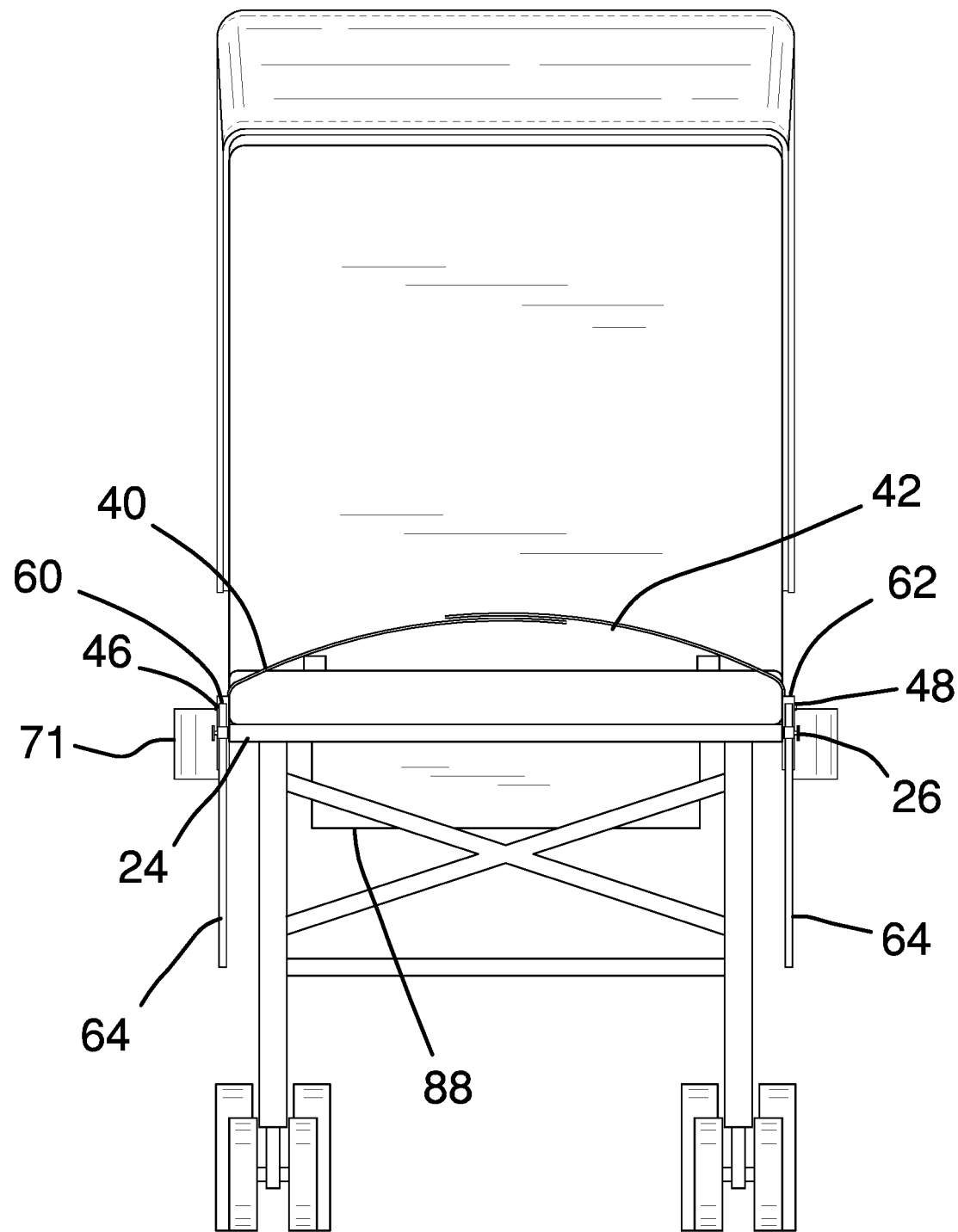
FIG. 2 is a front view of an embodiment of the disclosure.
Figure 3:
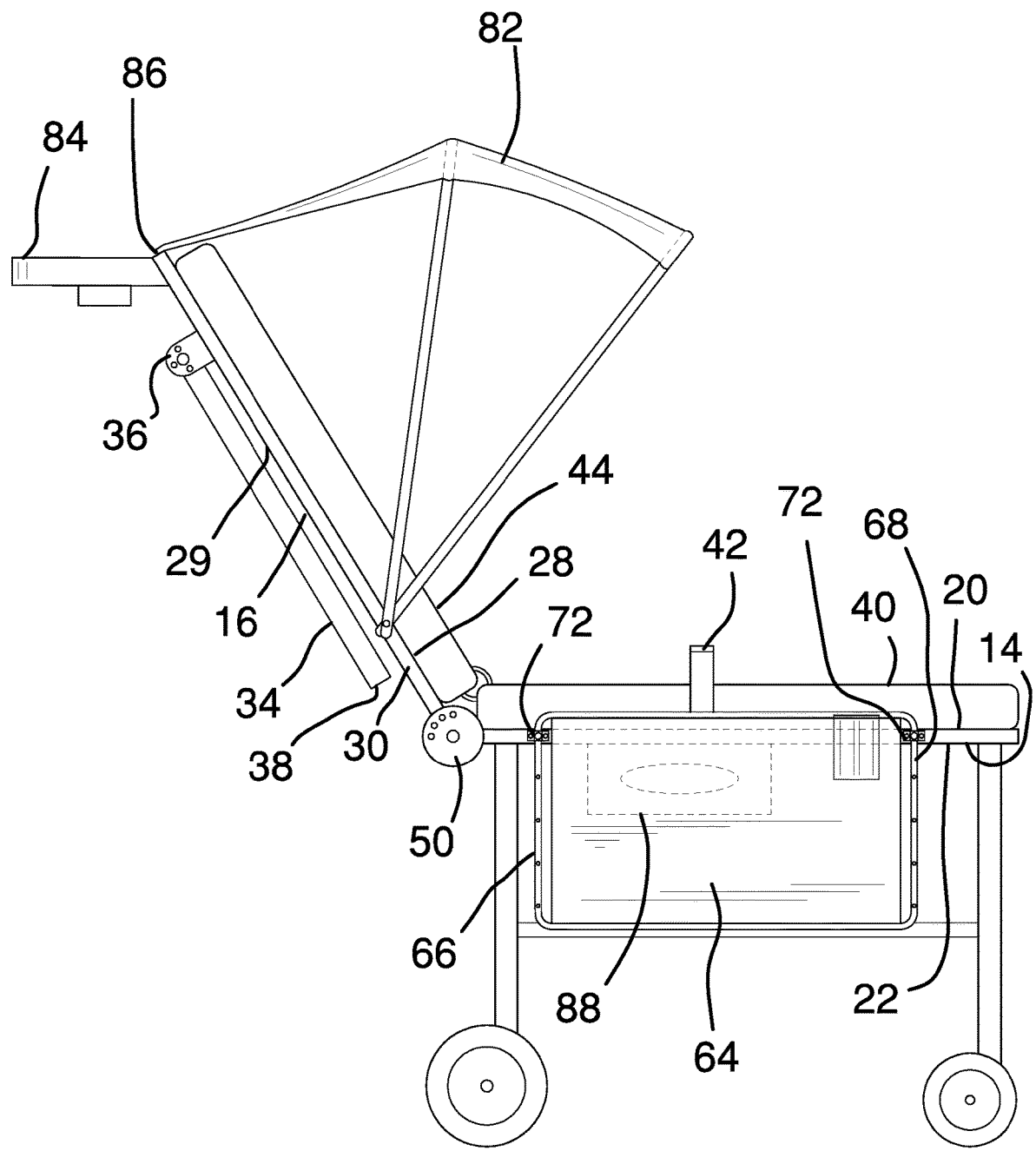
FIG. 3 is a right side view of an embodiment of the disclosure.
Figure 4:
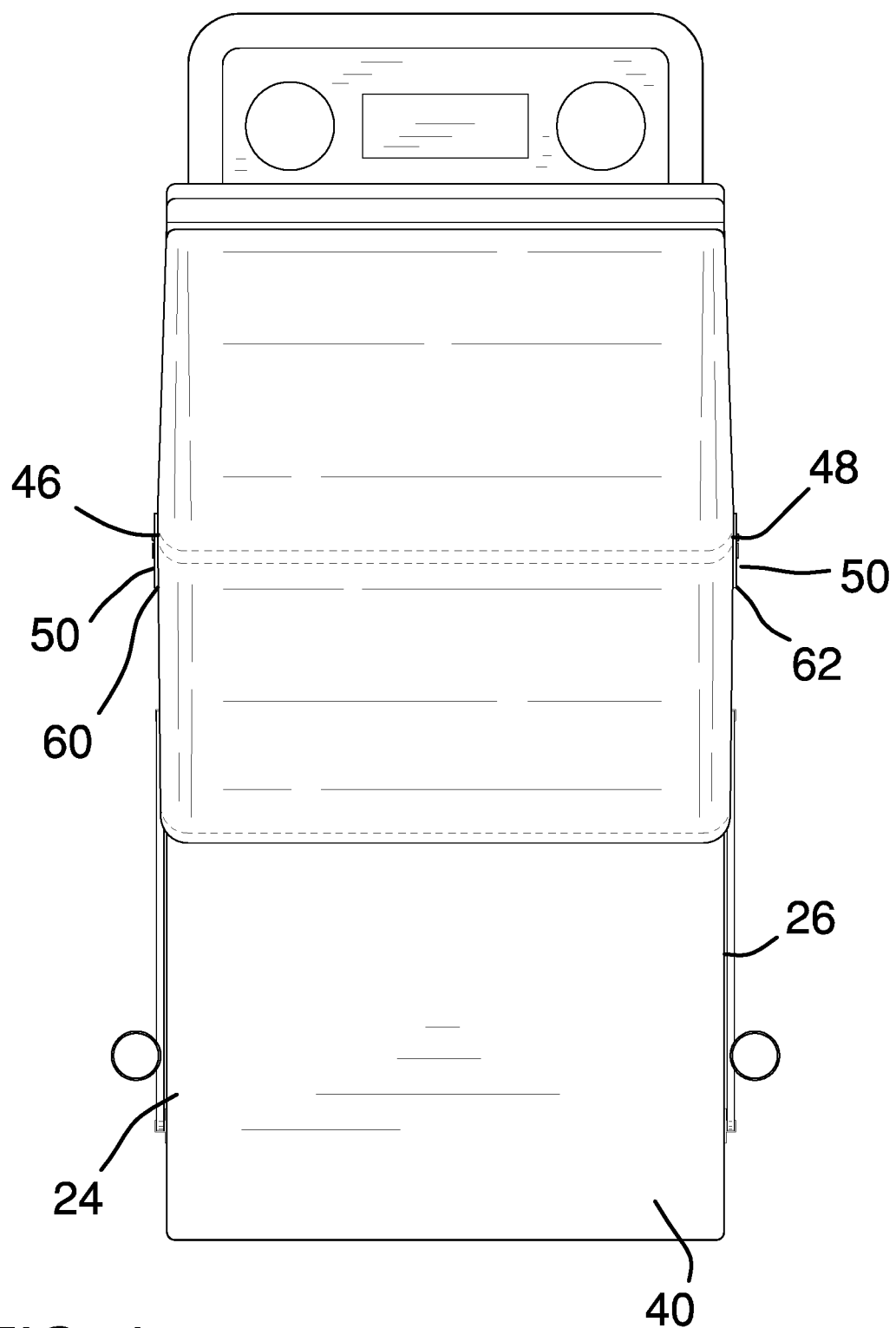
FIG. 4 is a top view of an embodiment of the disclosure.
Figure 5:
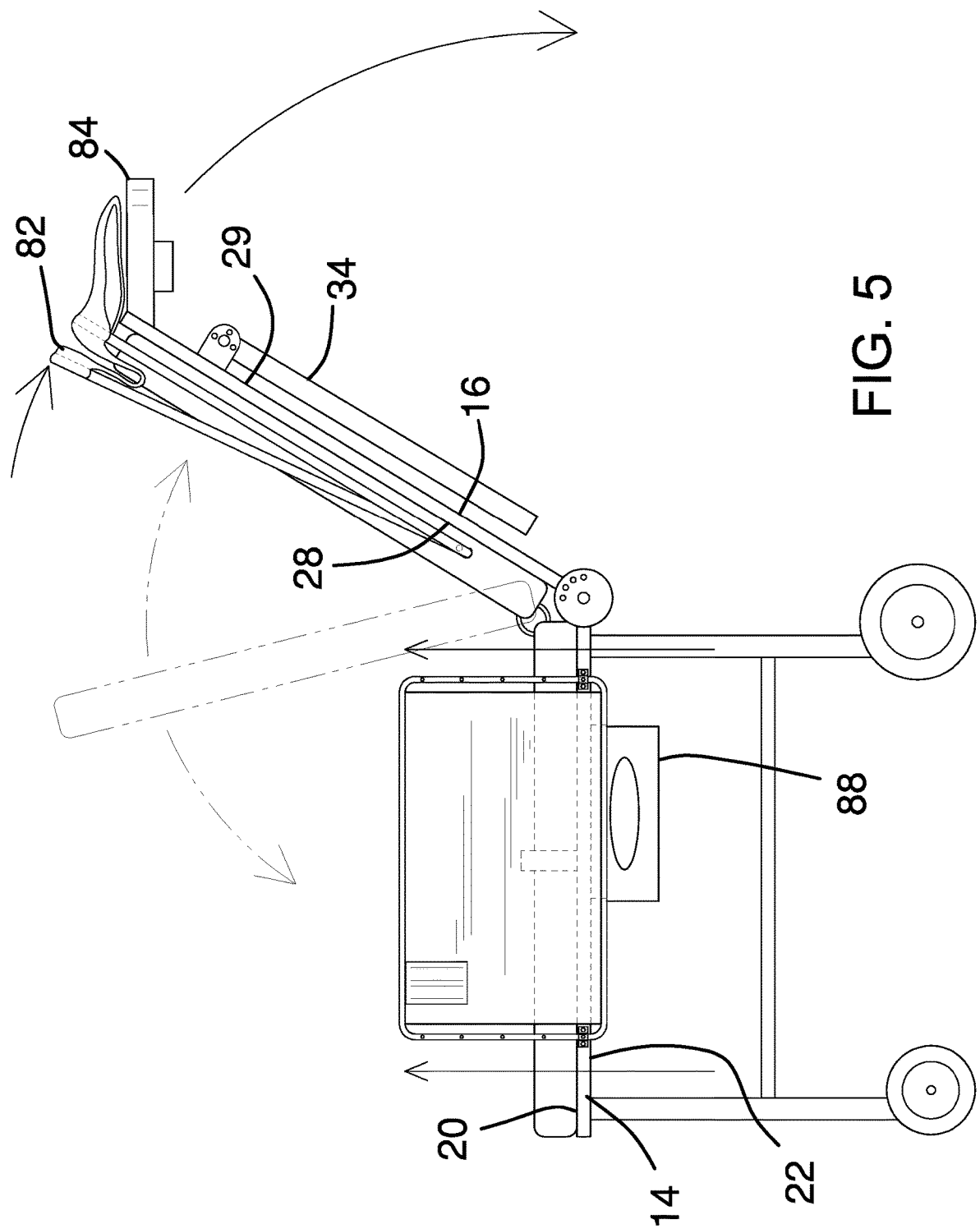
FIG. 5 is a left side view of an embodiment of the disclosure showing a backrest being moved into a reclined position and showing a privacy panel being moved into a deployed position.
Figure 6:
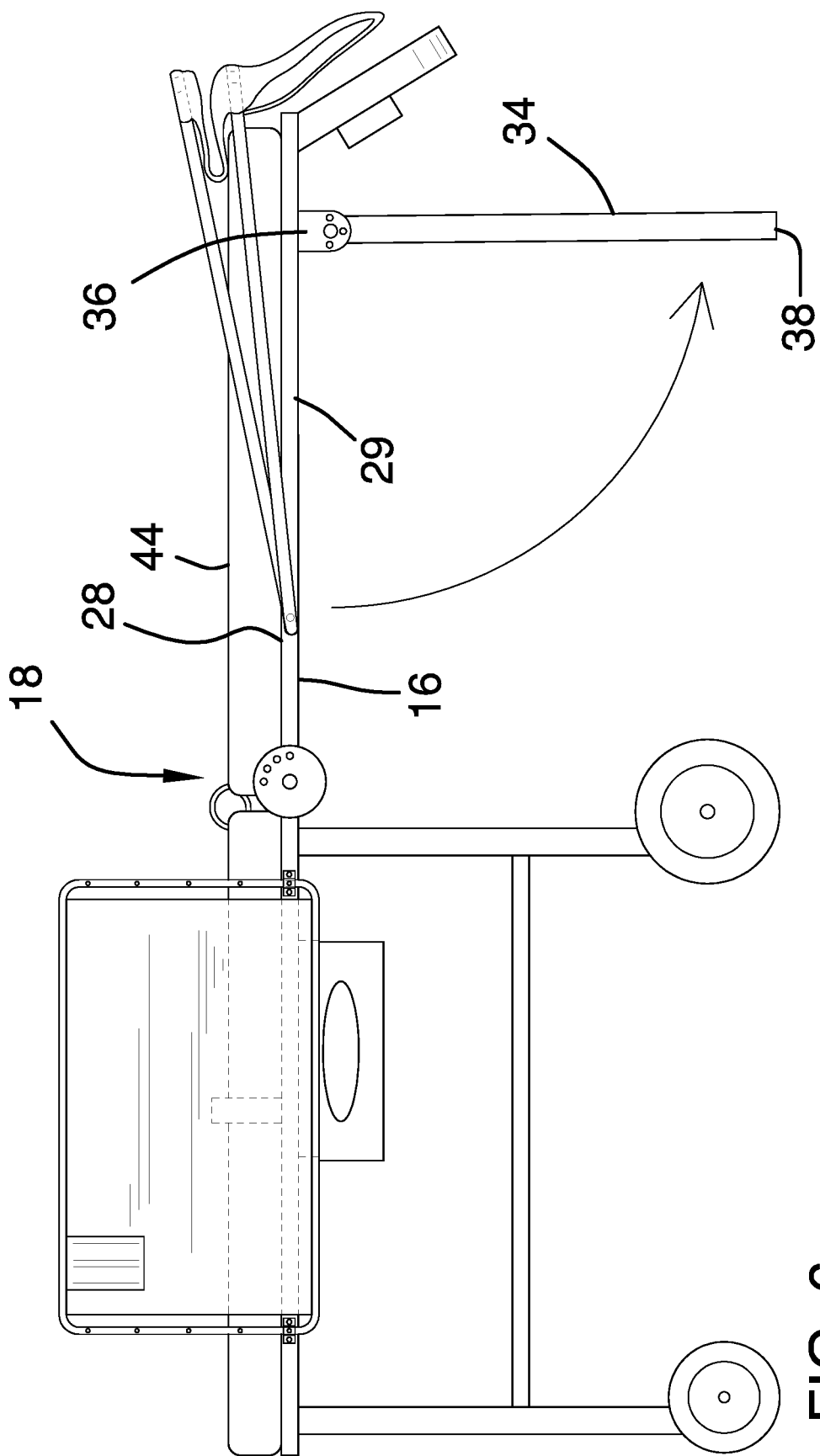
FIG. 6 is a left side view of an embodiment of the disclosure showing a diaper table being formed and showing a pair of legs being positioned in a deployed position.
Figure 7:
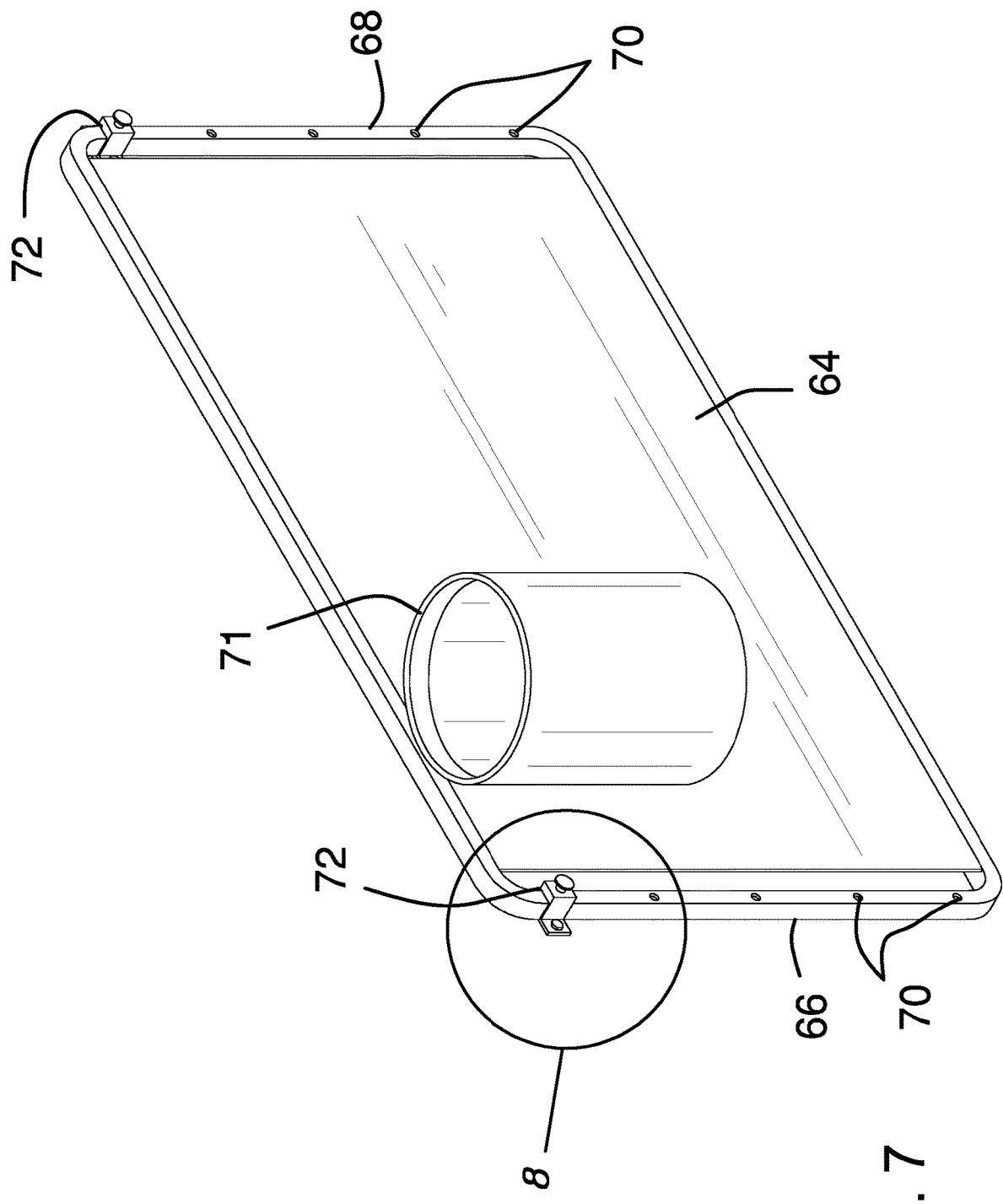
FIG. 7 is a perspective view of a privacy panel of an embodiment of the disclosure.

With reference now to the drawings, and in particular to FIGS. 1 through 9 thereof, a new stroller device embodying the principles and concepts of an embodiment of the disclosure and generally designated by the reference numeral 10 will be described.

As best illustrated in FIGS. 1 through 9, the convertible stroller assembly 10 generally comprises a stroller 12 that has a seat 14 and a backrest 16 that is pivotally coupled to the seat 14. The backrest 16 is positionable in an upright position such that the seat 14 and the backrest 16 may have an infant seated thereon. The backrest 16 is positionable in a reclined position having each of the seat 14 and the backrest 16 forms a diaper changing table 18. In this way the seat 14 and the backrest 16 can have the infant laid thereon for changing a diaper. The stroller 12 includes a plurality of wheels, legs 34, and other structural components common to infant strollers.

The seat 14 has a top surface 20, a bottom surface 22, a first lateral edge 24 and a second lateral edge 26. The backrest 16 has a front surface 28, a back surface 29, a first lateral edge 30 and a second lateral edge 32. A pair of legs 34 is each pivotally coupled to the backrest 16 and each of the legs 34 is positionable in a deployed position for supporting the backrest 16 when the backrest 16 is positioned in the reclined position. In this way the backrest 16 can support the weight of the infant. Each of the legs 34 has a first end 36 and a second end 38, and the first end 36 of each of the legs 34 is pivotally coupled to the back surface 29 of the backrest 16. Each of the legs 34 extends downwardly from the backrest 16 when the legs 34 are in the deployed position and the second end 38 of each of the legs 34 abuts the ground or other support surface. Additionally, each of the legs 34 lies against the backrest 16 when the legs 34 are positioned in a stored position.

A seat pad 40 is positioned on the seat 14 and the seat pad 40 is comprised of a resiliently compressible material. A belt 42 extends over the seat pad 40 and the belt 42 is matable to itself to form a closed loop for retaining the infant on the seat pad 40. In this way the belt 42 inhibits the infant from rolling off of the diaper changing table 18. A backrest pad 44 is positioned on the backrest 16 and the backrest pad 44 is comprised of a resiliently compressible material. A first pin 46 and a second pin 48 are each coupled to and extend away from a respective one of the first 24 and second 26 lateral edges of the backrest 16.

A pair of disks 50 is provided and each of the disks 50 has a first surface 52, a second surface 54 and a perimeter edge 56. Additionally, each of the disks 50 has a plurality of apertures 58 extending through the first 52 and second 54 surfaces. The apertures 58 in a respective one of the disks 50 are spaced apart from each other and are distributed along the perimeter edge 56 of the respective disk 50. The pair of disks 50 includes a first disk 60 and a second disk 62. The first disk 60 is coupled to the first lateral edge 24 of the seat 14 and the second disk 62 is coupled to the second lateral edge 26 of the seat 14. Each of the first 46 and second 48 pins engages a selected one of the apertures 58 in a respective one of the first 60 and second 62 disks to retain the backrest 16 at a selected angle with respect to the seat 14.

A pair of privacy panels 64 is each of the privacy panels 64 is slidably coupled to the seat 14. Each of the privacy panels 64 is positionable in a deployed position having each of the privacy panels 64 extending upwardly from the seat 14. Each of the privacy panels 64 conceals the infant while the diaper is being changed. Additionally, each of the privacy panels 64 is positionable in a stored position, and each of the privacy panels 64 includes a first lateral rail 66 and a second lateral rail 68. Each of the first 66 and second 68 lateral rails may each have a plurality of engagement points 70 thereon being distributed along an entire length of the first 66 and second 68 lateral rails. Each of the privacy panels 64 may have a cup holder 71 attached thereto for holding a beverage cup.

A plurality of receivers 72 is each coupled to the stroller 12 and each of the receivers 72 slidably engages a respective one of the privacy panels 64 for slidably retaining the privacy panels 64 on the stroller 12. Each of the receivers 72 has a front wall 74 that is spaced from a back wall 76 to define a slot 78 extending between the front 74 and back 76 walls. The back wall 76 of each of the receivers 72 is coupled to the stroller 12 such that an axis extending through the slot 78 is vertically oriented. The slot 78 in each of the receivers 72 slidably receives a respective one of the first 66 or second 68 lateral rails of the respective privacy panel 64 such that the privacy panels 64 can be raised and lowered in the receivers 72. A plurality of screws 80 each extends through the front wall 74 of a respective one of the receivers 72. Each of the screws 80 engages the respective first 66 or second 68 lateral rail 8 of the respective privacy panel 64 when the screws 80 are tightened for retaining the privacy panels 64 at a selected position. Additionally, each of the screws 80 may engage a selected one of the engagement points 70 in the respective first 66 or second 68 lateral rail.

A canopy 82 is provided and the canopy 82 is foldably coupled to the backrest 16. The canopy 82 is positionable in a deployed position for shading the infant when the infant is seated in the stroller 12. Additionally, the canopy 82 is positionable in a stored position prior to positioning the backrest 16 in the reclined position. A tray 84 is attached to a rear edge 86 of the backrest 16 and the tray 84 is oriented at an angle with the back surface 29 of the backrest 16. Moreover, the tray 84 is oriented to lie on a horizontal plane when the backrest 16 is positioned in the upright position. In this way the tray 84 can be gripped for pushing the stroller 12. The tray 84 may include cup holders and storage wells. A storage box 88 for moistened wipes is coupled to the bottom surface 22 of the seat 14 for storing moistened wipes for changing diapers.

In use, the backrest 16 is positioned in the upright position for employing the stroller 12 to transport the infant in the conventional means of employing a stroller 12.

Each of the legs 34 is positioned in the deployed position and the backrest 16 is positioned in the reclined position when the infant needs a diaper change. In this way the diaper changing table 18 is formed. Each of the privacy panels 64 is positioned at a selected height for concealing the infant when the diaper is being changed. The backrest 16 is positioned in the upright position when the diaper has been changed for continuing to transport the infant in the stroller 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A convertible stroller assembly being convertible into a diaper changing table wherein said assembly is configured to enable a user to transport an infant and facilitate changing diapers on the infant, said assembly comprising:
    a stroller having a seat and a backrest being pivotally coupled to said seat, said backrest being positionable in a reclined position having each of said seat and said backrest forming a diaper changing table wherein said seat and said backrest are configured to have the infant laid thereon for changing a diaper; and
    a pair of privacy panels, each of said privacy panels being slidably coupled to said seat, each of said privacy panels being positionable in a deployed position having each of said privacy panels extending upwardly from said seat wherein each of said privacy panels is configured to conceal the infant while the diaper is being changed, each of said privacy panels being positionable in a stored position.

2. The assembly according to claim 1, further comprising:
    said backrest having a front surface, a back surface, a first lateral edge and a second lateral edge;

a pair of legs having a first end and a second end, said first end of each of said legs being pivotally coupled to said back surface of said backrest, each of said legs extending downwardly from said backrest when said legs are in said deployed position, each of said legs lying against said backrest when said legs are in a folded positioned.

3. The assembly according to claim 2, further comprising:
said seat having a top surface, a bottom surface, a first lateral edge and a second lateral edge; and
a pair of disks, each of said disks having a first surface, a second surface and a perimeter edge, each of said disks having a plurality of apertures extending through said first and second surfaces, said apertures in a respective one of said disks being spaced apart from each other and being distributed along said perimeter edge of said respective disk.

4. The assembly according to claim 3, wherein said pair of disks includes a first disk and a second disk, said first disk being coupled to said first lateral edge of said seat, said second disk being coupled to said second lateral edge of said seat, each of said first and second pins engaging a selected one of said apertures in a respective one of said first and second disks to retain said backrest at a selected angle with respect to said seat.

5. The assembly according to claim 1, further comprising:
each of said privacy panels including a first lateral rail and a second lateral rail; and
a plurality of receivers, each of said receivers being coupled to said stroller, each of said receivers slidably engaging a respective one of said privacy panels for slidably retaining said privacy panels on said stroller, each of said receivers having a front wall being space from a back wall to define a slot extending between said front and back walls, said back wall of each of said receivers being coupled to said stroller, said slot in each of said receivers slidably receiving a respective one of said first or second lateral rails of said respective privacy panel such that said privacy panel can be raised and lowered in said receivers.

6. The assembly according to claim 5, further comprising a plurality of screws, each of said screws extending through said front wall of a respective one of said receivers, each of said screws engaging said respective first or second lateral rail of said respective privacy panel when said screws are tightened for retaining said privacy panels at a selected position.

7. A convertible stroller assembly being convertible into a diaper changing table wherein said assembly is configured to enable a user to transport an infant and facilitate changing diapers on the infant, said assembly comprising:
a stroller having a seat and a backrest being pivotally coupled to said seat, said backrest being positionable in an upright position wherein said seat and said backrest are configured to have an infant seated thereon, said backrest being positionable in a reclined position having each of said seat and said backrest forming a diaper changing table wherein said seat and said backrest are configured to have the infant laid thereon for changing a diaper, said seat having a top surface, a bottom surface, a first lateral edge and a second lateral edge, said backrest having a front surface, a back surface, a first lateral edge and a second lateral edge;
a pair of legs, each of said legs being pivotally coupled to said backrest, each of said legs being positionable in a deployed position for supporting said backrest when said backrest is positioned in said reclined position wherein said backrest is configured to support the weight of the infant, each of said legs having a first end and a second end, said first end of each of said legs being pivotally coupled to said back surface of said backrest, each of said legs extending downwardly from said backrest when said legs are in said deployed position, each of said legs lying against said backrest when said legs are positioned in a folded position;
a seat pad being positioned on said seat, said seat pad being comprised of a resiliently compressible material;
a belt extending over said seat pad and being matable to itself to form a closed loop wherein said belt is configured to retain the infant on said seat pad;
a backrest pad being positioned on said backrest, said backrest pad being comprised of a resiliently compressible material;
a first pin being coupled to and extending away from said first lateral edge of said backrest;
a second pin being coupled to and extending away from said second lateral edge of said backrest;
a pair of disks, each of said disks having a first surface, a second surface and a perimeter edge, each of said disks having a plurality of apertures extending through said first and second surfaces, said apertures in a respective one of said disks being spaced apart from each other and being distributed along said perimeter edge of said respective disk, said pair of disks including a first disk and a second disk, said first disk being coupled to said first lateral edge of said seat, said second disk being coupled to said second lateral edge of said seat, each of said first and second pins engaging a selected one of said apertures in a respective one of said first and second disks to retain said backrest at a selected angle with respect to said seat;
a pair of privacy panels, each of said privacy panels being slidably coupled to said seat, each of said privacy panels being positionable in a deployed position having each of said privacy panels extending upwardly from said seat wherein each of said privacy panels is configured to conceal the infant while the diaper is being changed, each of said privacy panels being positionable in a stored position, each of said privacy panels including a first lateral rail and a second lateral rail;
a plurality of receivers, each of said receivers being coupled to said stroller, each of said receivers slidably engaging a respective one of said privacy panels for slidably retaining said privacy panels on said stroller, each of said receivers having a front wall being space from a back wall to define a slot extending between said front and back walls, said back wall of each of said receivers being coupled to said stroller, said slot in each of said receivers slidably receiving a respective one of said first or second lateral rails of said respective privacy panel such that said privacy panel can be raised and lowered in said receivers; and
a plurality of screws, each of said screws extending through said front wall of a respective one of said receivers, each of said screws engaging said respective first or second lateral rail of said respective privacy panel when said screws are tightened for retaining said privacy panels at a selected position.

* * * * *